United States Patent
Vetter et al.

(10) Patent No.: US 8,619,892 B2
(45) Date of Patent: Dec. 31, 2013

(54) WIRELESS COMMUNICATION METHOD AND APPARATUS

(75) Inventors: Henning Vetter, Bristol (GB); Yong Sun, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 12/691,275

(22) Filed: Jan. 21, 2010

(65) Prior Publication Data

US 2010/0208837 A1 Aug. 19, 2010

(30) Foreign Application Priority Data

Jan. 22, 2009 (GB) .................................. 0901087.7

(51) Int. Cl.
*H04B 7/02* (2006.01)
(52) U.S. Cl.
USPC ......... 375/267; 375/295; 375/347; 455/562.1
(58) Field of Classification Search
None
See application file for complete search history.

(56) References Cited

U.S. PATENT DOCUMENTS

| | | | | |
|---|---|---|---|---|
| 7,180,956 B1 * | 2/2007 | Banister | ......................... | 375/267 |
| 7,224,758 B1 * | 5/2007 | Banister | ......................... | 375/358 |
| 7,499,727 B2 * | 3/2009 | Nakaya et al. | ............. | 455/562.1 |
| 2008/0247489 A1 * | 10/2008 | Kou et al. | ..................... | 375/299 |

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

The present invention provides a method of processing information prior to an emission from a multi-antenna device in a multi-user network having at least one user, said emission comprising transmission of a plurality of subcarriers comprising pilot symbols and data symbols, and said information being a data vector, the method comprising arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols, precoding said data vector prior to transmission, and the precoding comprising applying a perturbation to said data vector in order to generate a perturbed data vector in which data elements corresponding to the pilot symbol remain unperturbed, and scaling said data vector by means of a precoding matrix.

17 Claims, 11 Drawing Sheets

WIRELESS COMMUNICATION METHOD AND APPARATUS

FIELD OF THE INVENTION

The invention is in the field of wireless communication and particularly, though not exclusively, the field of multiple input, multiple output (MIMO) communications.

BACKGROUND OF THE INVENTION

MIMO technology has been widely implemented in wireless communications to improve performance. An underlying idea in MIMO systems is space-time signal processing, which effectively takes advantage of the separability of the spatial channels between the multiple transmit and multiple receive antennas of the MIMO channels to provide higher data rates without a concomitant increase in spectral usage or, alternatively, increased robustness and a lower error rate. Broadly speaking, coding a signal in space and/or time (spatial, time and space-time diversity) increases robustness by effectively providing numerous versions of a signal, whilst multiplexing in space (spatial multiplexing) effectively increases the available data rate. In a fixed configuration MIMO system a choice must be made as to this trade-off between spatial-multiplexing and space-time-diversity although one of the major advantages of MIMO systems is generally seen as their ability to provide an increased data rate transmission.

A conventional MIMO system, with $n_T$ transmit and $n_R$ receive antennas, can be modelled mathematically in the complex narrowband notation as:

$$y = Hx + n \quad (1)$$

where H is the $n_R \times n_T$ channel matrix, x is the $n_T \times 1$ transmit vector of complex symbols with an imposed transmit power constraint, for instance $\|x\|^2 = 1$ without loss of generality, y is the $n_R \times 1$ receive vector, and n is an $n_R \times 1$ zero-mean white Gaussian distributed noise vector with variance $\sigma_n^2$.

FIG. 1 shows a typical MIMO data communications system 10. A data source 12 provides data (comprising information bits or symbols) to a channel encoder 14. The channel encoder typically comprises a convolutional coder such as a recursive systematic convolutional (RSC) encoder, or a stronger so-called turbo encoder (which includes an interleaver). More bits are output than are input, and typically the rate is one half or one third. The channel encoder 14 is followed by a channel interleaver 16 and, in the illustrated example, a space-time encoder 18. The space-time encoder 18 encodes an incoming symbol or symbols as a plurality of code symbols, which are mapped to complex modulation symbols such as QPSK (quadrature phase shift keying), M-QAM (M-ary quadrature amplitude modulation) for simultaneous transmission from each of a plurality of transmit antennas 20.

Space-time encoding may be described in terms of an encoding machine, described by a coding matrix, which operates on the data to provide spatial and temporal transmit diversity or multiplexing; this is typically followed by a modulator to provide coded symbols for transmission. Space-frequency encoding may additionally (or alternatively) be employed. Thus, broadly speaking, incoming symbols and processed versions (such as symbols which are phase-shifted and scaled according to the Space-Time code algorithm) are distributed into a grid having space and time and/or frequency coordinates, for increased diversity. Where space-frequency coding is employed the separate frequency channels may be modulated onto OFDM (orthogonal frequency division multiplexed) carriers, a cyclic prefix generally being added to each transmitted OFDM symbol to mitigate the effects of channel dispersion.

The encoded transmitted signals propagate through MIMO channel 22 to receive antennas 24, which provide a plurality of inputs to a space-time (and/or frequency) decoder 26. This has the task of removing the effect of the encoder 18. The output of the decoder 26 comprises a plurality of signal streams, one for each transmit antenna, each carrying so-called soft or likelihood data on the probability of a transmitted symbol having a particular value. This data is provided to a channel de-interleaver 28 which reverses the effect of channel interleaver 16, and then to a channel decoder 30, such as a Viterbi decoder, which decodes the convolutional code. Typically channel decoder 30 is a SISO (soft-in soft-out) decoder, that is receiving symbol (or bit) likelihood data and providing similar likelihood data as an output rather than, say, data on which a hard decision has been made. The output of channel decoder 30 is provided to a data sink 32, for further processing of the data in any desired manner.

In some communications systems so-called turbo or iterative decoding is employed in which a soft output from channel decoder 30 is provided to a channel interleaver 34, corresponding to channel interleaver 16, which in turn provides soft (likelihood) data to decoder 26 for iterative space-time (and/or frequency) and channel decoding. (It will be appreciated that in such an arrangement channel decoder 30 provides complete transmitted symbols to decoder 26, that is for example including error check bits.)

A Multi-User MIMO (MU-MIMO) system is a type of advanced MIMO system that exploits the availability of multiple independent terminals (or users) in order to enhance the communication capabilities of each individual terminal. Essentially, all users in the system are coordinated for communications by considering the requirements of each user, such as scheduling algorithms, Quality of Service requirements, and so on. The fundamental advantage of a MU-MIMO system is that a direct gain in multiple access capacity can be achieved by allowing spatial multiplexing gain to be obtained at a base station, without having the need of multiple antenna terminals. This allows smaller terminals to be developed at a low cost, while keeping the implementation cost and complexity at the base station. An example of a MU-MIMO scheme is Space-Division Multiple Access (SDMA), which allows a base station to transmit (or receive) a signal to (or from) multiple users in the same band simultaneously.

An example of a practical implementation of a conventional MU-MIMO system 40 comprising a transmitter device 42, and a plurality of receiver devices 46, 48 is illustrated in FIG. 2. In this example, the transmitter device 42 is operable to transmit signals to receiver devices 46, 48 in a wireless network through a wireless channel. In this illustrated example, three transmit antennas 44 are provided, though practical implementations may include more (or fewer) antennas depending on the application.

Precoding algorithm is generally applied to support multi-user MIMO (MU-MIMO) communication systems. Precoding algorithm can be sub-divided into linear and nonlinear precoding.

Linear precoding is essentially a generalisation of a conventional SDMA scheme, where users are assigned different precoding matrices at the transmitter. The precoders are typically designed jointly based on channel state information (CSI) of all the users, although other sources of information are equally possible, for example a code book entry.

It has been noted that non-linear precoding provides better performance than linear precoding in that the error rate performance can be improved through additional transmit signal processing. However, as will be described in the forthcoming paragraphs, non-linear precoding requires a nonlinear operation to be performed at the receiver in order to reconstruct the transmitted symbols.

Precoding can be also employed in OFDM systems. In such a system, it can be applied, for example, for each subcarrier separately or for a group of subcarriers. For example, an OFDM system having 512 subcarriers can have a joint transmit power constraint of 512, or an average transmit power constraint $\|x\|^2=1$, without loss of generality.

Precoding can be achieved in several ways. For example, the Moore-Penrose pseudoinverse $P=H^+=H^H(HH^H)^{-1}$ can be applied at the transmitter side, which, in one network configuration, can be at a base station. If $n_T=n_R$, P becomes simply $P=H^{-1}$. This precoding step is necessary for instance in multi-user MIMO systems, wherein each element of y will be assigned to an independent user terminal (UT), and therefore no cooperation will be possible between the UTs. In such a case, the precoding matrix P will suppress the inter-user interference; nevertheless the above technique may also be employed in a single-user MIMO system or a multi-user multi-antenna MIMO system, where one or more UTs have more than one receive antenna.

A further example of precoding is the regularised pseudo-inverse $P=H^H(HH^H+\alpha I)^{-1}$, as set out in "A vector-perturbation technique for near-capacity multiantenna multiuser communication—part I: channel inversion and regularization," (C. B. Peel, B. M. Hochwald, and A. L. Swindlehurst, *IEEE Trans. on Commun.*, vol. 53, no. 1, pp. 195-202, January 2005), hereinafter referred to as "Peel et al.", where $\alpha=K\sigma_n^2$ is defined, and K is the number of spatial streams.

However, a drawback of precoding by means of the pseudoinverse channel matrix, or regularised pseudoinverse channel matrix (or in general any non-unitary matrix) is that it can lead to an increase in transmitted power. This is addressed in "A vector-perturbation technique for near-capacity multiantenna multiuser communication—part II: perturbation," (B. M. Hochwald, C. B. Peel, and A. L. Swindlehurst, *IEEE Trans. on Commun.*, vol. 53, no. 3, pp. 537-544, March 2005) hereinafter referred to as "Hochwald et al.". Variations in transmitted power are undesirable, particularly as they may violate performance constraints for a device. They may also lead to increased power consumption, which is an important factor in the design of a handheld or otherwise portable communications device.

To illustrate problems faced and identified in the prior art, an example will now be given. In this example, u denotes the symbols, prior to precoding, to be transmitted. The vector is precoded by means of a precoding matrix P, which is chosen to be the Moore-Penrose pseudoinverse $P=H^+$, as $$s=Pu \quad (2)$$

The Moore-Penrose pseudoinverse is well known, but is particularly referenced in "On the reciprocal of the general algebraic matrix" (E. H. Moore; Bulletin of the American Mathematical Society 26: 394-395) and "A generalized inverse for matrices" (R. Penrose; Proceedings of the Cambridge Philosophical Society 51: 406-413).

Prior to transmission, the precoded signal s has to be scaled in order to fulfil the power restriction $\|x\|^2=1$, such that $$x = \frac{s}{\sqrt{\gamma}} \quad (3)$$

where $\gamma=\|s\|^2=\|Pu\|^2$ as set out in Peel et al. This approach assumes perfect knowledge of $\gamma$ at the receiver side.

The normalisation factor is often very large because of the large singular values of the precoding matrix P, i.e., of the pseudoinverse of the channel matrix H (such as noted in papers by Hochwald et al. and by Peel et al., cited above). This can cause noise amplification at the receiver side since the receive symbol vector $y=\sqrt{\gamma}(Hx+n)$, or equivalently, $$\frac{y}{\sqrt{\gamma}} = (Hx+n),$$

is impaired by a scaled Gaussian noise vector $\sqrt{\gamma}n$. In a MIMO OFDM system, the instantaneous normalisation factor of a transmission can be determined for each subcarrier or the average normalisation factor can be determined as a mean value for all the subcarriers, or any other grouping of resources to resource blocks and the like. This may be, for example in an Orthogonal frequency-division multiple access (OFDMA) MIMO system, where different subcarriers are assigned to different groups of terminals, thus representing multiple multi-user MIMO configurations.

Hochwald et al. suggests that one way of overcoming this noise amplification is to ensure that the transmitted data u does not lie along the singular values of $H^{-1}$ (or $H^+$, as the case may be). This approach is also described in U.S. Pat. No. 7,317,764. The idea is to allow u to be perturbed by a complex vector. The perturbed data vector is then:

$$\hat{u}=u+\tau l \quad (4)$$

where $\tau$ is a positive real number and l is a complex integer vector. The scalar $\tau$ is selected to be sufficiently large that the receiver may apply element-wise a modulo function to y $$\hat{u}_i = f_\tau(y_i) = y_i - \left\lfloor \frac{y_i + \tau/2}{\tau} \right\rfloor \tau \quad (5)$$

to obtain $\hat{u}$, where $\lfloor \, \rfloor$ rounds towards the nearest integer closest to zero. It will be noted that $f_\tau(y_i)$ is applied to real and imaginary parts separately. It should be recognised by the reader that $\hat{u}$ is not quantised and therefore contains additive noise.

Hochwald et al. also suggests that the constellation shift parameter $\tau$ should be $$\tau = 2\left(|c|_{max} + \frac{\Delta}{2}\right) \quad (6)$$

where $|c|_{max}$ is the absolute value of the real or imaginary part of the constellation max symbol with greatest magnitude, and $\Delta$ is the smallest distance between two constellation symbols. It will be understood that the foregoing is set out for M-QAM constellations; non-square constellations such as PSK (Phase shift keying) or other, such as hexagonal constellations, may have a constellation shift parameter $\tau$ that is essentially the distance between the centres of repeated equidistantly shifted constellations.

FIG. 3 illustrates the modulo operation at the receiver side for a 16-QAM constellation. The received symbol, marked with an 'x', is shifted from the extended constellation (unfilled points) back to the original constellation (filled points), in which the symbol detection stage will be done. As will be appreciated by the reader, the average number of neighbouring points will be increased, as points of the original constellation which were previously considered to be at the edge of the constellation now have a complete set of neighbours. This has an impact on the error protection of the outer symbols. The shift parameter τ, as the distance between the centres of the respective constellations, can lower this impact if it is chosen to be greater than defined in Equation 6.

In accordance with the above, for a given τ, l can be selected in order to minimise γ=∥s∥², such that:

$$l = \arg\min_{l'} \|P(u+\tau l')\|^2 \quad (7)$$

This is an integer least squares problem in the dimension of u, for the solution of which there exist a large number of algorithms. For instance, the reader is directed to "Closest point search in lattices" (E. Agrell, T. Eriksson, A. Vardy, and K. Zeger, *IEEE Transactions on Information Theory*, vol. 48, no. 8, pp. 2201-2214, August 2002) and to the references noted in Hochwald et al., especially the Fincke-Pohst algorithm, which is used for space-time demodulation in "Lattice code decoder for space-time codes," (M. O. Damen, A. Chkeif, and J.-C. Belfiore, *IEEE Commun. Letters*, vol. 4, pp. 161-163, May 2000), where it is called a sphere decoder. Because this algorithm can be used for encoding the data vector u, it is called a "sphere encoder".

If $\mathcal{G}$ is defined as the set:

$$\mathcal{G} = \{a+ib \mid a,b \in \mathbb{Z}\}, \text{ with } i^2 = -1,$$

that is, the set of complex-valued integers, then an approximation of l can be calculated, and the perturbation vector is then given as $$l_{approx} = -TQ_{\tau \mathcal{G}^K}\{T^{-1}u\},$$

where the quantisation function $Q_{\tau \mathcal{G}^K}\{\cdot\}$ rounds the K-dimensional vector towards the nearest complex-valued point of the K-dimensional integer lattice, scaled with τ (depicted by $\tau \mathcal{G}^K$), where K is the number of spatial streams, i.e., the dimension of the vector u.

A practical implementation as an integer rounding function, indicated by $\mathcal{G}$, can be $$l_{approx} = -TQ_{\mathcal{G}^K}\left\{\frac{T^{-1}u}{\tau}\right\}. \quad (8)$$

Due to the denominator τ, the complex-integer-rounding function operates in a scaled integer lattice.

This is as set out in "Lattice-reduction-aided broadcast precoding," (C. Windpassinger, R. F. H. Fischer, and J. B. Huber, *IEEE Trans. on Commun.*, vol. 52, no. 12, pp. 2057-2060, December 2004—"Windpassinger et al.").

A number of lattice reduction algorithms exist. Any one of them can be used to calculate a transformation matrix, T, such that a reduced basis, P̃, is given by PT. The matrix T contains only complex integer entries and its determinant is |det(T)|=1 and thus is called a unimodular matrix.

The unimodular matrix T is given by means of a lattice reduction of the precoding matrix P with the LLL algorithm "Factoring Polynomials with Rational Coefficients" (A. Lenstra, H. Lenstra and L. Lovasz, *Math Ann.*, Vol. 261, pp. 515-534, 1982.), but any other algorithm for reducing a lattice basis is also applicable.

The normalisation factor γ is then determined, by means of a closest point approximation, as:

$$\gamma = \|s\|^2 = \|P(u+\tau l_{approx})\|^2 \quad (9)$$

The complete transmission employing non-linear precoding can thus be formulated as $$y = \left(H\left(\frac{P(u+\tau l)}{\sqrt{\gamma}}\right) + n\right) \quad (10)$$

with y being the receive signal of a single user or a plurality of users, each receiving one or more elements $y_i$ of the vector y.

A block diagram of a transmission train employing data perturbation is shown in FIG. 4. As illustrated in FIG. 4, vector perturbation is carried out on the transmitted data u in a vector perturbation unit 60. The perturbed data is passed to be multiplied by the pseudo inverse H⁺ in block 62, which is equivalent to equation 2 set out above. The next block 64 represents division by √γ, which is a normalisation step. The resultant vector x is re-multiplied by the channel matrix H (in block 66), to which is added a noise vector n. In block 68, the resultant vector y is re-multiplied by the square root of the normalisation factor γ and then modulo τ is applied to arrive at the perturbed data vector û.

By way of background, the Tomlinson-Harashima precoding (herein referred to as multi-user THP) will now be described. In this example the channel H is decomposed as $$H = P^T B W^{-1} \quad (11)$$

Accordingly, it is possible to define $$QR = (P^T H)^{-1} \quad (12)$$

where P is a permutation matrix such that $PP^T = I$, Q is a unitary matrix, and R is an upper triangular matrix. The feedback matrix B with ones in the diagonal is defined as:

$$B = GR \quad (13)$$

where the scaling matrix G is $G = \text{diag}(r_{11}^{-1}, r_{22}^{-1}, \ldots, r_{KK}^{-1})$. Accordingly, the feed forward matrix W can then be defined as $$W = QG^{-1} \quad (14)$$

It will be appreciated that the scaling matrix is applied to obtain equal power distribution across the transmit antennas. Therefore, the unnormalised transmit vector can be defined as $$s = WB^{-1}P(u+\tau l) \quad (15)$$

where τ is the perturbation shift distance known from vector perturbation.

The transmitted symbols are determined by $$x = \frac{s}{\sqrt{\gamma}} \quad (16)$$

where γ=∥s∥², such that the received symbols are given as:

$$y = Hx + n \quad (17)$$

$$y = H\left(\frac{WB^{-1}P(u+\tau l)}{\sqrt{\gamma}}\right) + n$$

$$y = P^T BW^{-1}\left(\frac{WB^{-1}P(u+\tau l)}{\sqrt{\gamma}}\right) + n$$

$$y = \frac{(u+\tau l)}{\sqrt{\gamma}} + n$$

A block diagram of a multi-user THP transmission is shown in FIG. 5. As illustrated in FIG. 5, the transmitted data u is multiplied by the transpose of the permutation matrix P in block 80. The computation of the perturbed and precoded vector s in equation (15) can be formulated recursively in block 82 due to the triangular structure of B, in which a temporary vector $\bar{s}$ is required, and accordingly an initial element is defined as:

$$\bar{s}_K = [P^T u]_K, \quad (18)$$

which is the transmit symbol of the last (K-th) stream. For i=K−1, ..., 1 the remaining elements of $\bar{s}$ can be determined in block 82 as $$\bar{s}_i = \mathrm{mod}\left([P^T u]_i - \sum_{j=i+1}^{K} B_{ij} \bar{s}_j, \tau\right) \quad (19)$$

where mod is the modulo function mod $$(y_i, \tau) = y_i - \left\lfloor \frac{y_i + \tau/2}{\tau} \right\rfloor \tau$$

similar to equation (5), which is applied separately for real and imaginary part.

The precoded vector s in equation (15) can be calculated in block 84 as follows:

$$s = W\bar{s} \quad (20)$$

The next block 86 represents division by $\sqrt{\gamma}$, which is a normalisation step. The resultant vector x is re-multiplied by the channel matrix H (in block 88), to which is added a noise vector n. In block 90, the resultant vector y is re-multiplied by the square root of the normalisation factor γ and then modulo τ is applied to arrive at the perturbed data vector û.

In most MIMO communication systems, pilot symbols are transmitted together with the data symbols by the transmitter to assist the receiver in performing channel estimation or provide information such as frequency offset or phase rotation. Essentially, the pilot signals enable the receiver to perform accurate estimation of the time varying channel, thereby resulting in a reduced bit error rate (BER). The pilot symbols can either be transmitted continuously or periodically with the data symbols, depending on the application in which the pilot symbols are implemented.

Generally, when precoding is applied, the pilot symbols and the data symbols are precoded using the same technique to provide information about the effective channel. This information can be initially estimated by, for example a preamble which is known at the receiver, and the pilots symbols are provided to keep track of this information in order to allow the receiver to estimate the channel. However, if the actual channel knowledge is required by the receivers, unprecoded pilot will need to be transmitted. Unprecoded pilots are generally referred to as "common pilots", as these pilots provide channel estimation information for all the receivers in the wireless network. Conversely, pilots for estimating the effective channel are called "dedicated pilots", as these pilots provide information to a specific user in the MIMO network.

IEEE 802.11n/D2.0. "Draft Amendment to Standard for Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput," IEEE Std 802.11, February 2007, discloses a method of estimating channel parameters concurrently in a multi-carrier MIMO system. A plurality of pilot symbol vectors are transmitted together with a plurality of data symbols vectors over the communication channel. A pilot vector contains only pilot symbols. The MIMO receiver estimates the communication channel based on a preamble in this example, and the pilot vectors are used to track frequency offset and other time-varying and/or frequency dependent parameters such as phase errors and rotation, and the like, during the current frame, which consists of several OFDM symbols. In addition, beamforming can be used at the transmitter when a beamforming matrix is applied prior to transmission, thus linear precoding is employed. Since both pilot subcarriers and data subcarriers are precoded, the pilots are dedicated to the receiving UT.

Although the example above relates to an OFDM MIMO system, it would be appreciated by skilled reader that similar techniques can also be applied in an Orthogonal frequency-division multiple access (OFDMA) MIMO system, where subcarriers in frequency domain can be allocated to multiple users, possibly having different precoders for their respective subcarriers.

It is noted that existing methods apply the same precoding technique to precode the dedicated pilot vector and the data symbols vector. The existing methods are also applicable to a MU-MIMO system employing linear precoding, where the transmitter separates the spatial streams reasonably well, such that the UTs in the same time-frequency resource can receive and decode their respective spatial stream or streams independently from each other. Conventional pilot vectors as described in the previous example can be used for example to track frequency offset, phase errors, phase rotation, and in particular the channel gain in order to decode the received symbols.

An important requirement for the arrangement of the pilot vectors is that the pilot symbols and position are known by the transmitter and the receiver. When nonlinear precoding is used upon data and pilot subcarriers, the pilot symbols are not unique, since any non-zero perturbation element in equation (4) for a pilot vector will change the pilot signal. Thus the receiver does not know the pilot value and cannot estimate necessary parameters for data decoding.

A method of overcoming this problem is to apply linear precoding to the dedicated pilot subcarriers and to apply non-linear precoding to the data subcarriers independently. FIG. 6 illustrates the steps of applying precoding to the data subcarriers and the pilot subcarriers in accordance with the prior art. The method commences in step 100 with an application of data perturbation to the data vector. In step 102, non-linear precoding is applied to the data subcarriers to generate a precoded data vector, which is achieved by applying the precoding matrix to the perturbed data vector. The dedicated pilot subcarriers are precoded by applying linear precoding thereto (step 104).

FIG. 7 illustrates the allocation of pilot symbols based on existing techniques commonly used in the prior art. In FIG. 7, the data transmission frame 110 comprises F number of subcarriers 112. Each of the subcarriers comprises a data vector containing either pilot symbols or data symbols. As shown in FIG. 7, the subcarriers are divided into K spatial streams, each of which comprises either a pilot symbol or a data symbol, depending on whether that subcarrier is allocated to the pilot symbols or the data symbols. In this prior art example, two of the subcarriers 112-d and 112-F are allocated to the pilot symbols and the remaining subcarriers (for example: 112-a, 112-b, 112c and so on) are allocated to the data symbols. However, one of the major drawbacks of using this method is that the entire subcarrier is allocated to the pilot symbols. Therefore, this can result in substantial increase in transmit power of the pilot subcarriers compared to the nonlinearly precoded data symbols. When the normalisation of a transmission is performed with an average γ over all subcarriers or a resource block consisting of data and pilot subcarriers, the increased in transmit power of the pilot subcarriers will consequently result in less power being available for the data subcarriers. Moreover, the system performance can further deteriorate if more pilot subcarriers are applied, resulting in the transmission approaching a pure linear precoded transmission.

SUMMARY OF THE INVENTION

In a first aspect of the present invention there is provided a method of processing information prior to an emission from a multi-antenna device in a multi-user network having at least one user, said emission comprising transmission of a plurality of subcarriers comprising pilot symbols and data symbols, and said information being a data vector, the method comprising arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols, precoding said data vector prior to transmission, and the precoding comprising applying a perturbation to said data vector in order to generate a perturbed data vector in which data elements corresponding to the pilot symbol remain unperturbed, and scaling said data vector by means of a precoding matrix.

In one embodiment of the present invention, the perturbation may be expressible as a perturbation vector comprising a diagonal matrix and a complex integer vector, said diagonal matrix being perturbation elements corresponding to said at least one of data symbol and/or said at least one of pilot symbol.

The applying of said perturbation to said precoded information may be performed by selecting at least one of said perturbation elements corresponding to said at least one pilot symbol and scaling said selected at least one of said perturbation elements.

The scaling of said selected at least one of said perturbation elements may be performed on the basis of a scaling factor employed in said scaling.

The scaling factor may be a number substantially higher than 1, and is expressible in the form $L \gg 1$, where L is a scaling factor.

The perturbation vector may be selected by solving an integer least squares problem such that a normalisation factor is minimised.

The solving of the integer least squares problem may include applying a further scaling factor to the integer least squares problem.

The integer least squares problem may be expressible in the form $l_{all}=\arg\min_{l'}\|P(u+\Omega l')\|^2$, where $u+\Omega l'$ is a perturbed data vector, u is a data vector, $\Omega$ is a diagonal matrix of positive real numbers, l' is a complex integer vector, and P is a precoding matrix.

The further scaling factor may be applied to the integer least squares problem such that said integer least squares problem is expressible in the form $l=\arg\min_{l'}\|\hat{P}(u+\tau l')\|^2$, where $\hat{P}=P\Omega$.

In an embodiment of the above aspect, the method may further comprise the step of determining a solution for solving said integer least squares problem.

In one example described herein, the solution may be a lattice reduction closest point approximation expressible in the form $l_{approx}=-\hat{T}\mathcal{Q}_{\mathcal{G}^K}\{\hat{T}^{-1}\Omega^{-1}u\}$, where $\hat{T}$ is a lattice reduction transformation matrix.

The lattice reduction transformation matrix may be determined by applying a lattice reduction algorithm, and is expressible in the form $\hat{T}=LLL(\hat{P})$, where $\hat{P}=P\Omega$. One example of a lattice reduction algorithm is the LLL algorithm.

The perturbation elements may be a plurality of constellation shift parameter.

The plurality of constellation shift parameter may be distinct from each other.

In a further embodiment of the above aspect, said perturbation vector may comprise a number and a complex integer vector, said complex integer vector comprising at least one element corresponding to said at least one pilot symbol and/or at least one data symbol, said perturbation vector being selected by solving an integer least squares problem such that a normalisation factor is minimised, wherein said solving the integer least squares problem includes applying a constraint to the integer least squares problem.

The integer least squares problem may be expressible in the form $l=\arg\min_{l'}\|P(u+\tau l')\|^2$, where $u+\tau l'$ is a perturbed data vector, u is a data vector, τ is a positive real number, l' is a complex integer vector, and P is a precoding matrix.

The applying of constraint may be performed by applying a zero constraint to said at least one element corresponding to said at least one pilot symbol, such that the integer least squares problem may be expressible in the form $$\tilde{l} = \arg\min_{\tilde{l}'}\left\|P\left(u+\Omega\begin{pmatrix}0\\\tilde{l}'\end{pmatrix}\right)\right\|^2, \text{ where } l=\begin{pmatrix}0\\\tilde{l}\end{pmatrix}$$

is the perturbation vector, assuming that said at least one pilot is/are allocated to the zero-entries, and $\tilde{l}'$ is a complex integer vector.

When the constellation shift parameters are distinct from each other, the integer least squares problem may be expressible in the form $l=\arg\min_{l'}\|P(u+\Omega l')\|^2$, where $u+\Omega l'$ is a perturbed data vector, u is a data vector, $\Omega$ is a diagonal matrix of positive real numbers, l' is a complex integer vector, and P is a precoding matrix.

The applying of constraint may be performed by applying a zero constraint to said at least one element corresponding to said at least one pilot symbol, such that the integer least squares problem may be expressible in the form $$\tilde{l} = \arg\min_{\tilde{l}'}\left\|P\left(u+\Omega\begin{pmatrix}0\\\tilde{l}'\end{pmatrix}\right)\right\|^2, \text{ where } l=\begin{pmatrix}0\\\tilde{l}\end{pmatrix}$$

is the perturbation vector.

The precoding matrix may be pseudo inverse channel characteristics of said at least one user.

BRIEF DESCRIPTION OF THE DRAWINGS

Further aspects, features and advantages of the invention will become apparent from the following description of specific embodiments thereof, with reference to the accompanying drawings, in which.

DETAILED DESCRIPTION

Specific embodiments of the present invention will be described in further detail on the basis of the attached diagrams. It will be appreciated that this is by way of example only, and should not be viewed as presenting any limitation on the scope of protection sought.

Figure 1:
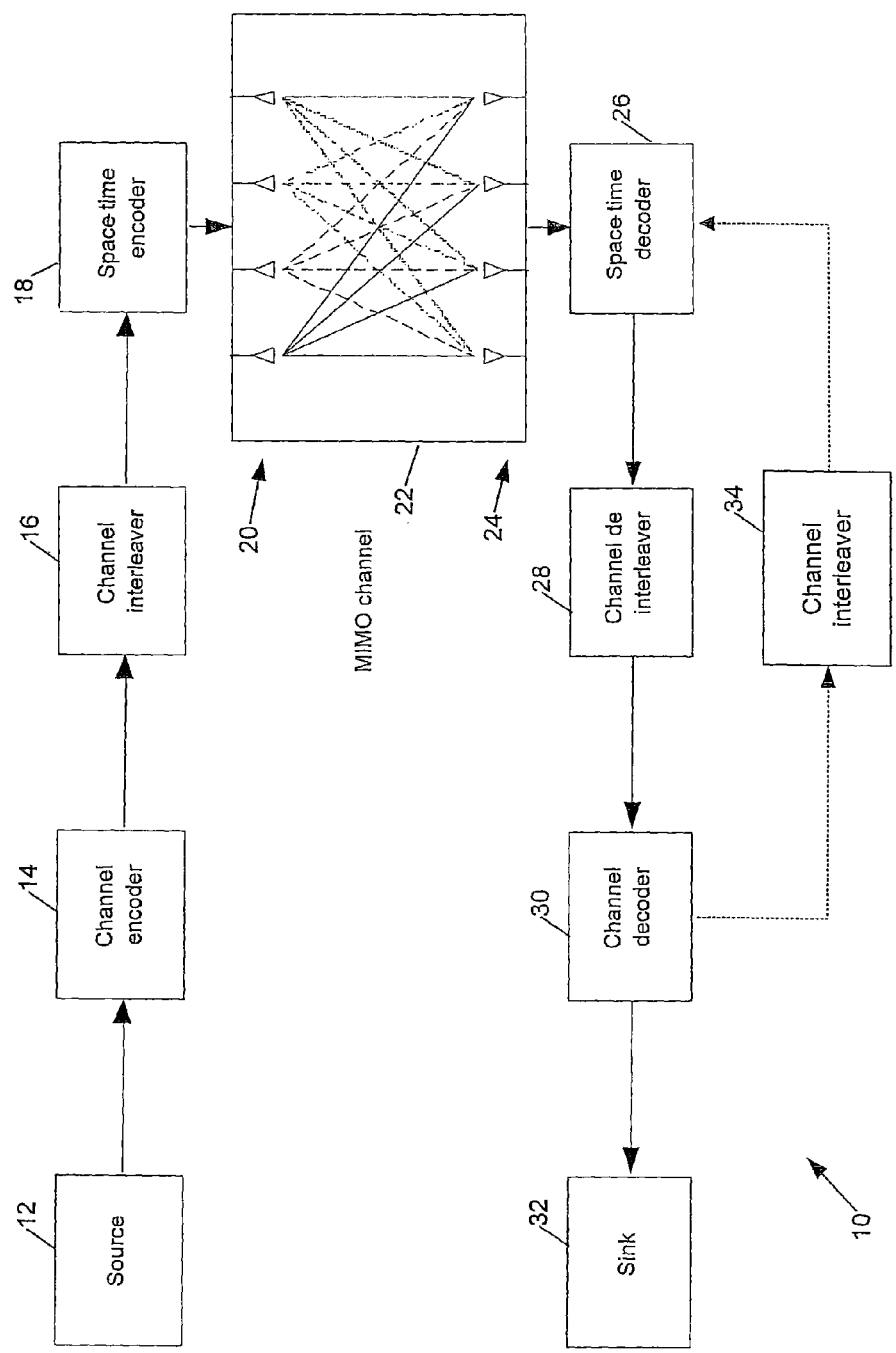
FIG. 1 illustrates a generalised architecture of a typical MIMO data communications system.
Figure 2:
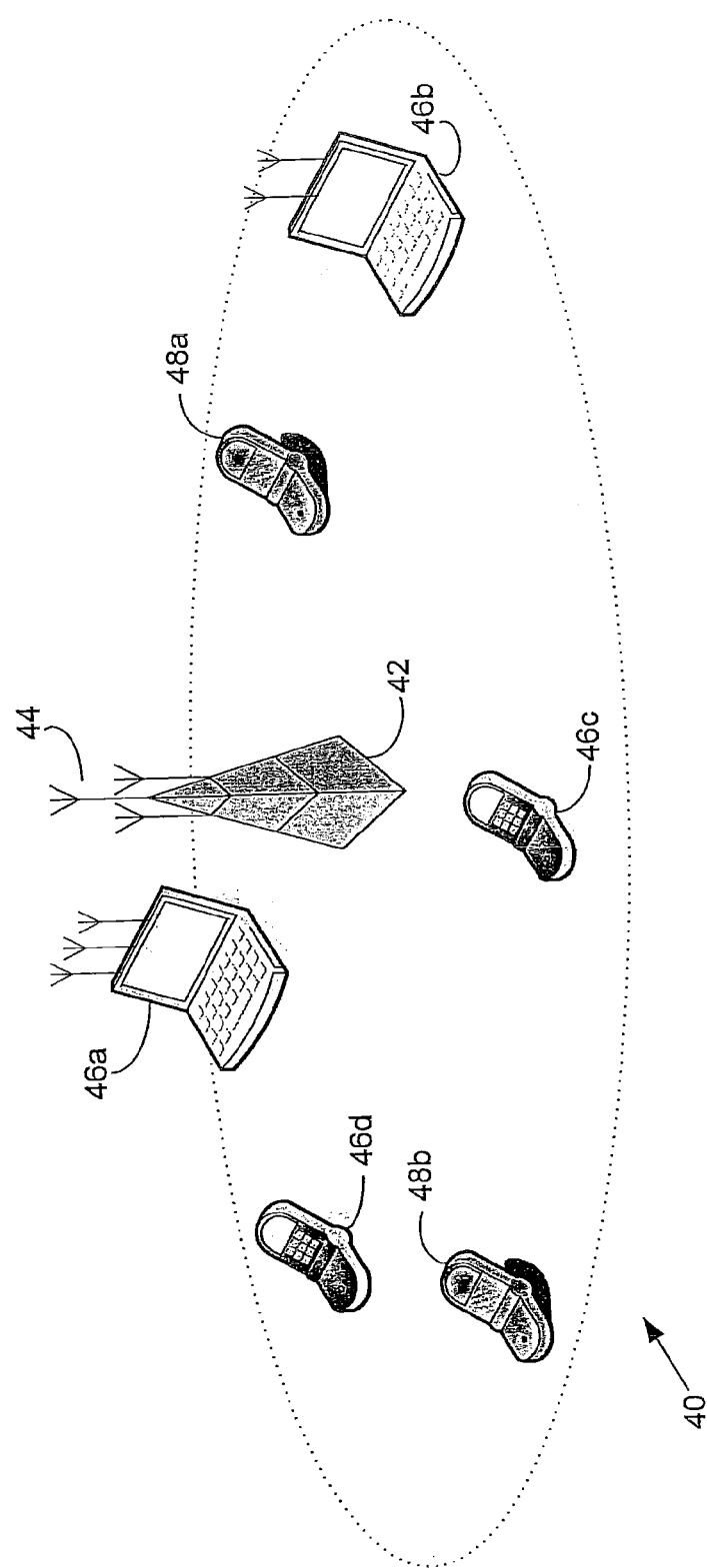
FIG. 2 illustrates an exemplary wireless communications network arrangement having at least one user.
Figure 3:
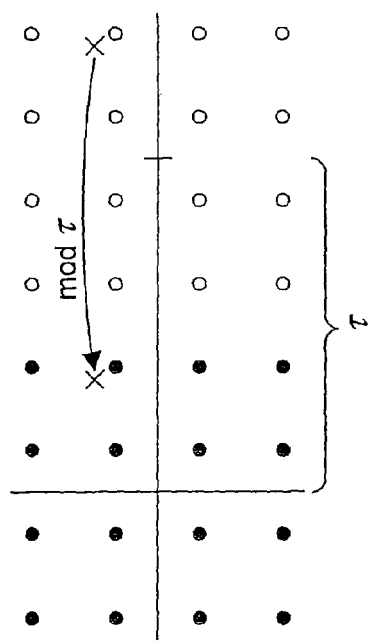
FIG. 3 illustrates a 16 QAM constellation having a modulo operation applied thereto.
Figure 4:
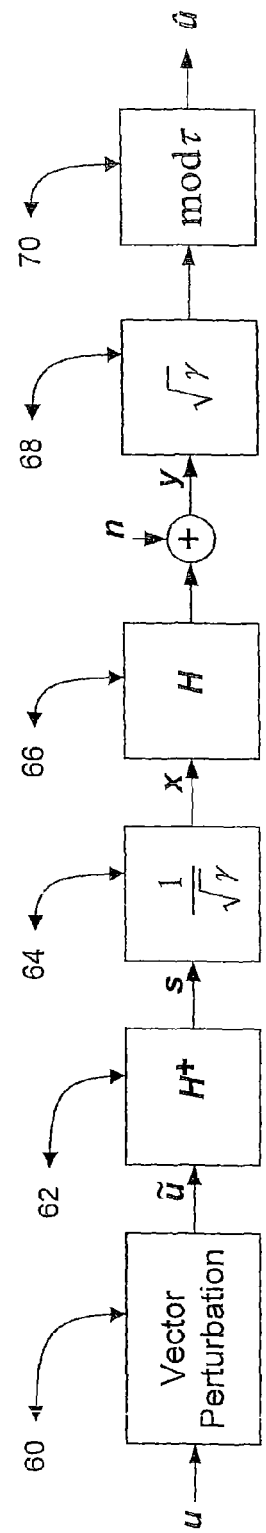
FIG. 4 illustrates a block diagram of a transmission train employing data perturbation.
Figure 5:
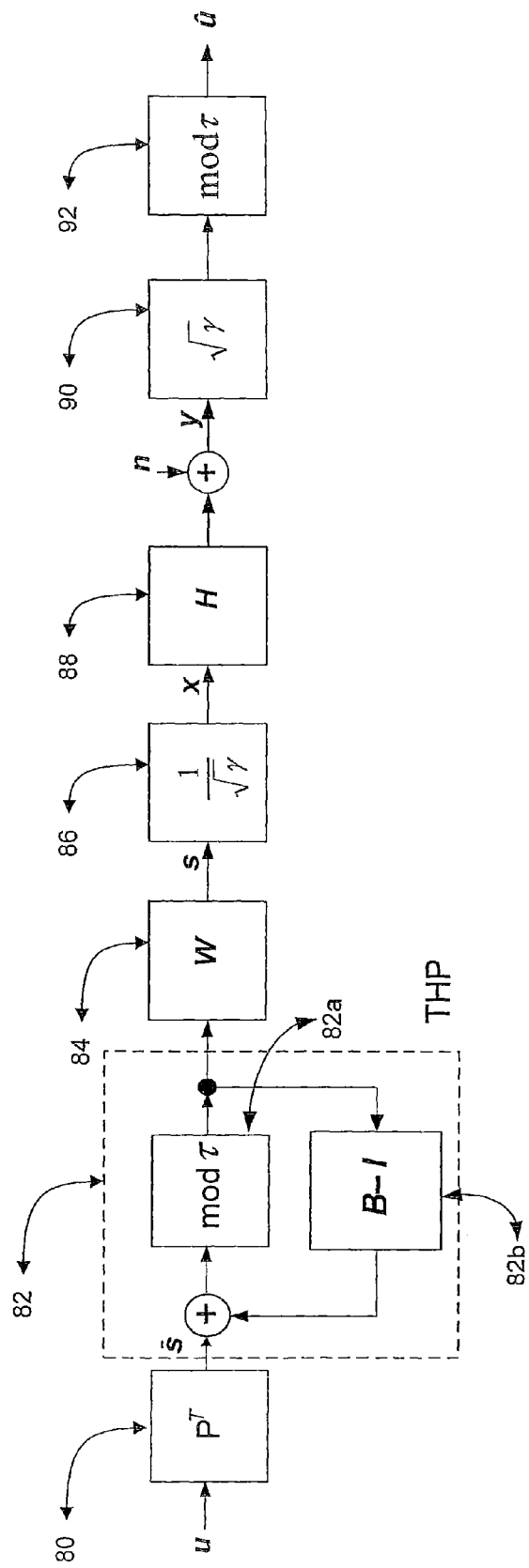
FIG. 5 illustrates a block diagram of a transmission train employing Tomlinson-Harashima precoding.
Figure 6:
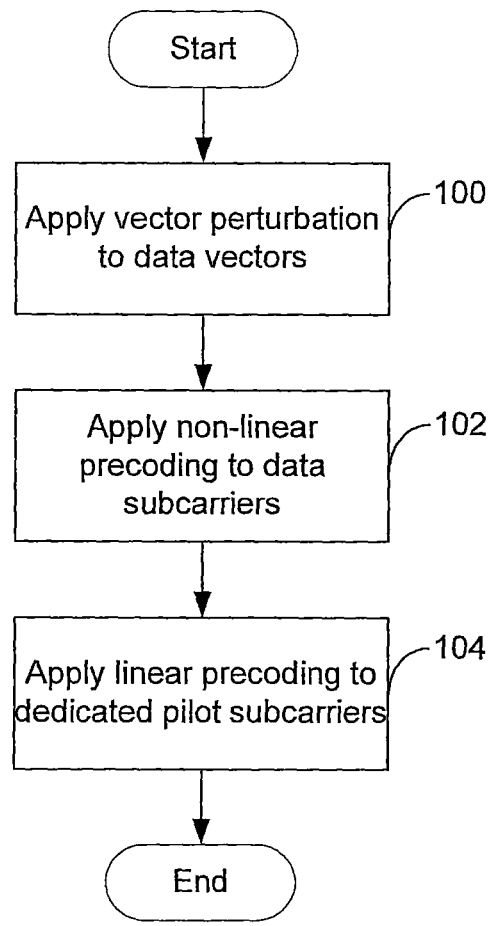
FIG. 6 illustrates a flow diagram of a method of precoding data comprising pilot symbols and data symbols, in accordance with the prior art.
Figure 7:
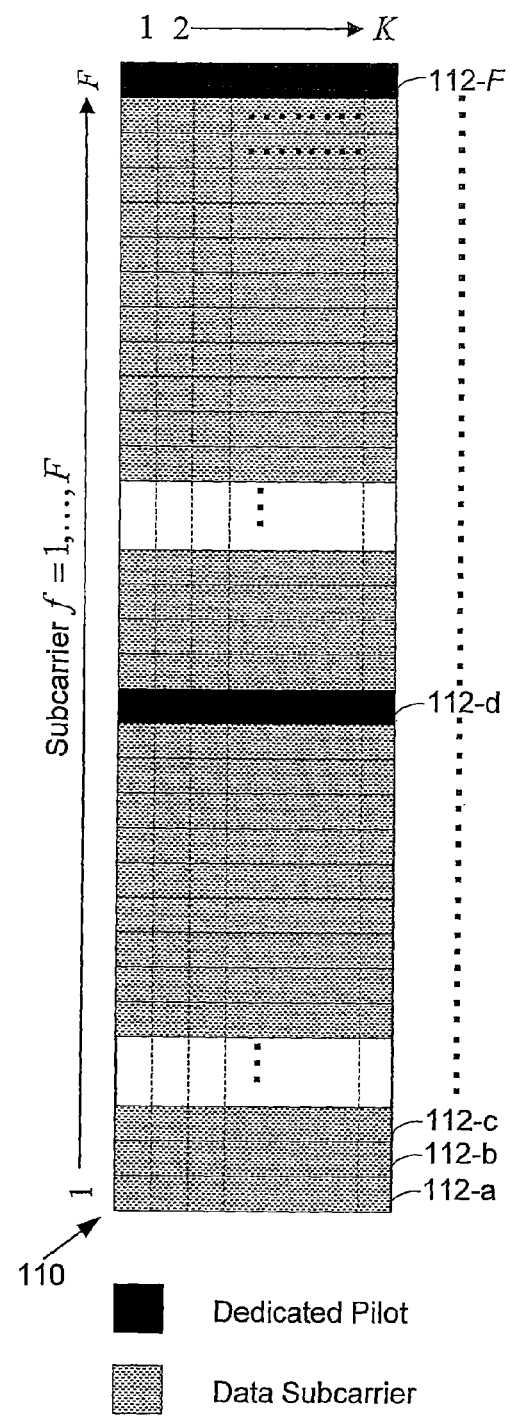
FIG. 7 illustrates allocation of pilot symbols and data symbols in a transmission frame in accordance with the prior art.
Figure 8:
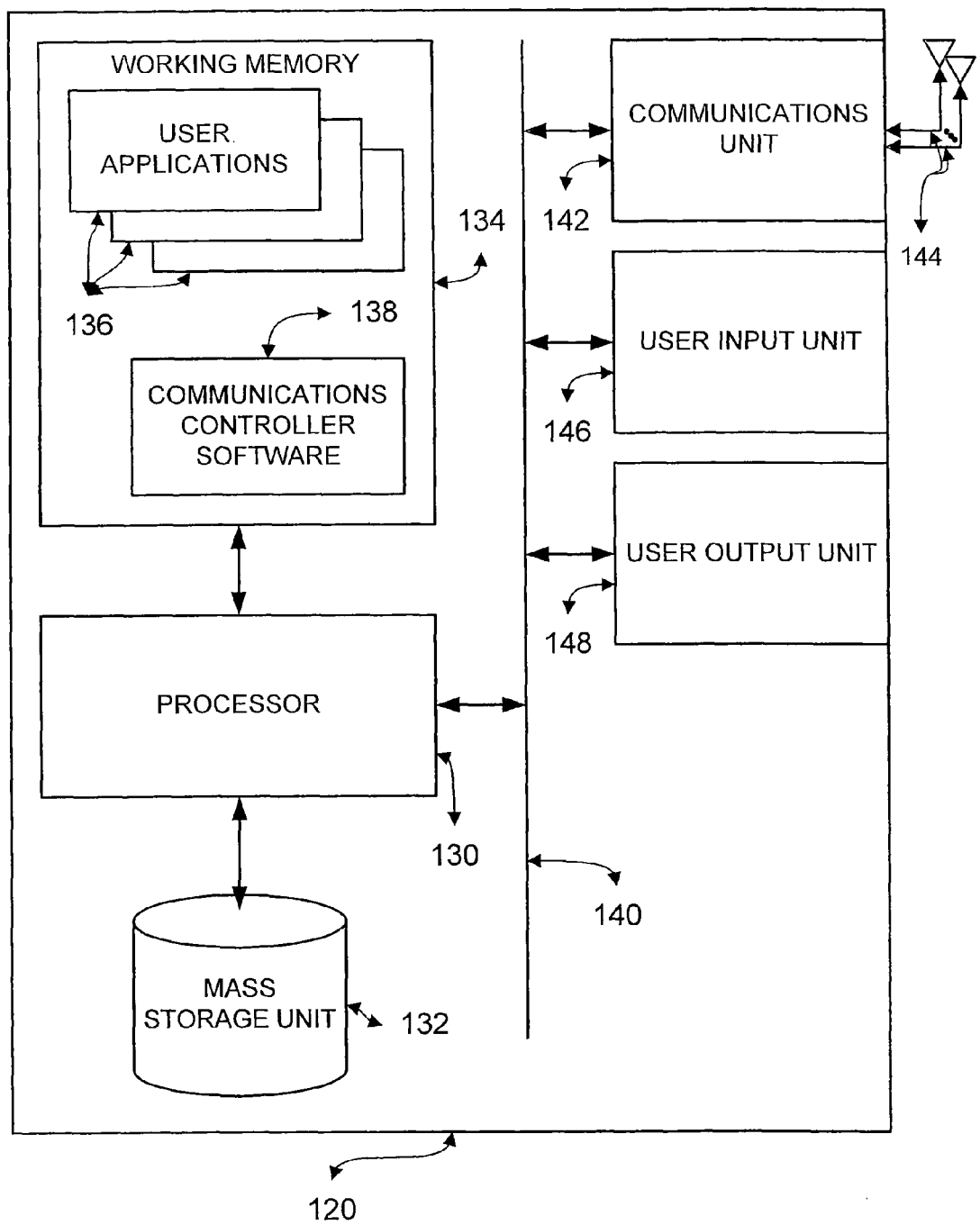
FIG. 8 illustrates an exemplary wireless communication device incorporating a specific embodiment of the invention.

The present invention will now be described with reference to an implementation of a wireless communication device. FIG. 8 illustrates schematically hardware operably configured (by means of software or application specific hardware components) as a wireless communication device 120.

The wireless communication device 120 illustrated in FIG. 8 is generally capable of being used in a MU-MIMO context, to establish a MU-MIMO communications channel with one or more other devices and, in accordance with a specific embodiment of the invention, to take account of channel information so as to derive a pre-coding scheme appropriate to the quality of the channel. The reader will appreciate that the actual implementation of the wireless communication device is non-specific, in that it could be a base station or a user terminal.

The device 120 comprises a processor 130 operable to execute machine code instructions stored in a working memory 134 and/or retrievable from a mass storage device 132. By means of a general purpose bus 140, user operable input devices 146 are capable of communication with the processor 130. The user operable input devices 146 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 148 are further connected to the general purpose bus 140, for the output of information to a user. Audio/video output hardware devices 148 can include a visual display unit, a speaker or any other device capable of presenting information to a user.

Communications hardware devices 142, connected to the general purpose bus 140, are connected to antennas 144. In the illustrated embodiment in FIG. 8, the working memory 134 stores user applications 136 which, when executed by the processor 130, cause the establishment of a user interface to enable communication of data to and from a user. The applications in this embodiment establish general purpose or specific computer implemented utilities that might habitually be used by a user.

Communications facilities 138 in accordance with the specific embodiment are also stored in the working memory 134, for establishing a communications protocol to enable data generated in the execution of one of the applications 136 to be processed and then passed to the communications hardware devices 142 for transmission and communication with another communications device. It will be understood that the software defining the applications 136 and the communications facilities 138 may be partly stored in the working memory 134 and the mass storage device 132, for convenience. A memory manager could optionally be provided to enable this to be managed effectively, to take account of the possible different speeds of access to data stored in the working memory 134 and the mass storage device 132.

On execution by the processor 130 of processor executable instructions corresponding with the communications facilities 138, the processor 130 is operable to establish communication with another device in accordance with a recognised communications protocol.

Figure 9:
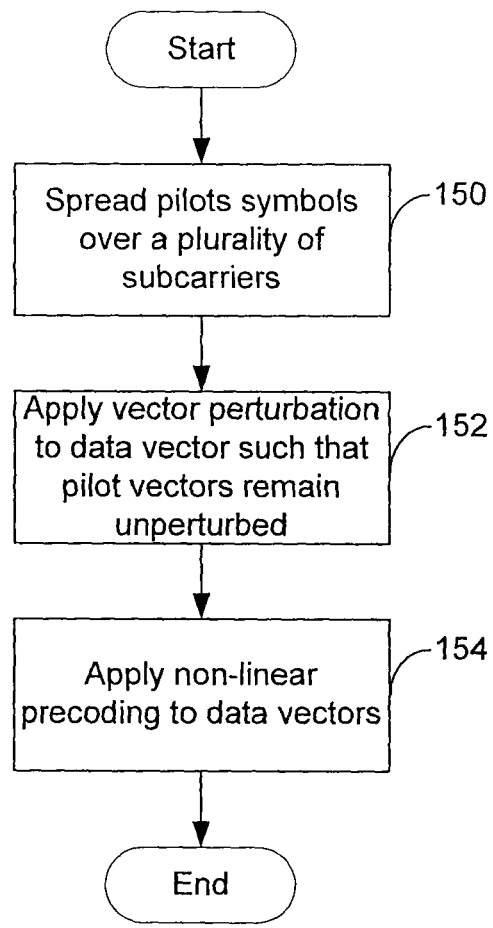
FIG. 9 illustrates a flow diagram of a method of precoding data vectors comprising pilot symbols and data symbols, in accordance with an embodiment of the present invention.

A method of performing non-linear precoding in a multi-carrier MU-MIMO transmission comprising pilot symbols and symbols according to the invention will be described with reference to FIGS. 9 and 10. The method in accordance with the present invention can be achieved by first spreading the pilot symbols over a plurality of subcarriers (step 150) such that each of the plurality of subcarriers comprises at least one pilot symbols.

Figure 10:
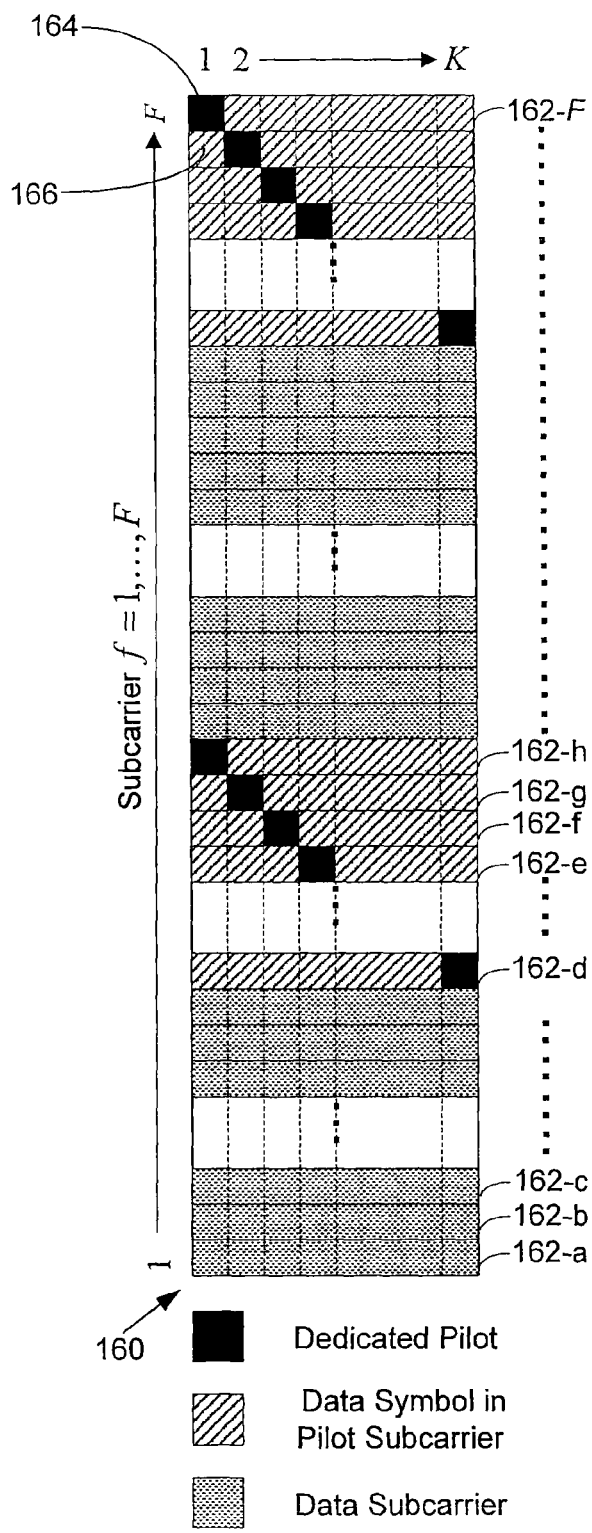
FIG. 10 illustrates allocation of pilot symbols and data symbols in a transmission frame in accordance with the invention.

As illustrated in FIG. 10, the data transmission frame 160 comprises F number of subcarriers 112. The subcarriers 162 are divided into K spatial streams, wherein each of the subcarriers comprises either (1) one pilot symbol and K−1 data symbols (for example 162-$h$), or (2) K data symbols (for example 162-$b$), as opposed to occupying an entire subcarrier with pilot symbols. It is further noted that the pilot symbols may not be necessarily allocated in a neighbouring subcarrier. In the example illustrated in FIG. 10, one pilot symbol is allocated in the first spatial stream of subcarrier 162-$h$, another pilot symbol is allocated in the second spatial stream of subcarrier 162-$g$, and so on. It is noted that the pilot symbols can also be allocated in a different configuration. For example, one pilot symbol could be allocated to the third spatial stream of subcarrier 162-$h$, one pilot symbol could be allocated to the first spatial stream of subcarrier 162-$g$, and so on.

One of the advantages of spreading the pilot symbols in such a way before applying precoding is that it allows non-perturbation of pilot symbols without deteriorating the system performance. As a result, more power are available for the data symbols. Further advantages of this method will be evident to the skilled reader in the forthcoming paragraphs. In this example, one pilot symbol is allocated to the subcarrier (for example 162-d). However, it is noted that the skilled person will appreciate that more than one pilot symbols can be allocated to the subcarrier. For example, the subcarrier can comprise one data symbols and K−1 pilot symbols.

It is noted that the above method of spreading pilot symbols over a plurality of subcarriers (in the frequency domain) can be likewise applied in the time domain, that is, over (several) OFDM symbols, or frames 160, or a combination of spreading over time and frequency domain.

In step 152, the method commences with an application of vector perturbation to the data vector u such that:

$$\hat{u}=u+\tau l$$

where r is a positive real number and l is a complex integer vector.

In step 154, non-linear precoding is then applied to each of the subcarriers to generate a precoded data vector, s. This step is carried out by means of a channel inverse precoder $P=H^{-1}$ (or pseudoinverse) as $$s=P\hat{u}$$

In one embodiment of the invention, the solution for finding the perturbation vector l in a multi-carrier MIMO transmission comprising at least one pilot symbol and at least one data symbol can therefore be defined as $$l_{all}=\arg\min\nolimits_{l'}\|P(u+\tau l')\|^2 \quad (21)$$

Figure 11:
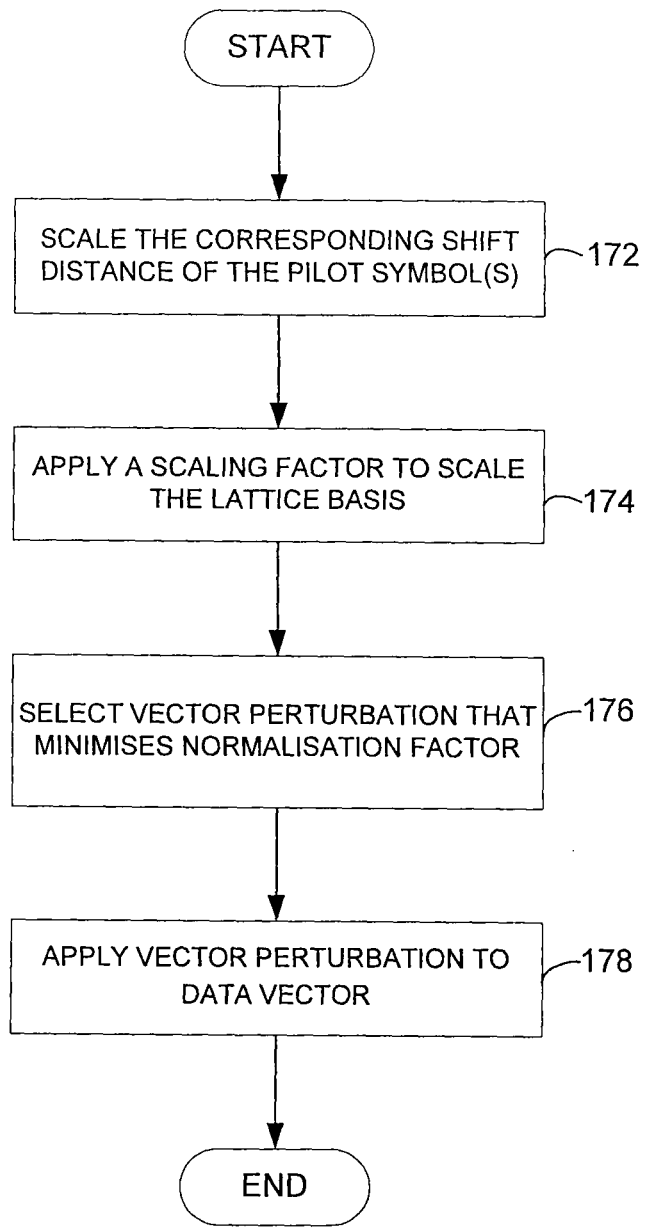
FIG. 11 illustrates a flow diagram of a precoding method in accordance with a first embodiment of the invention.

Essentially, the method in accordance with the present embodiment avoids perturbation of the element or elements which corresponds to the pilot symbol or symbols by reducing the likelihood of a perturbation on this element. In this example, there is one pilot element in the subcarrier and is referred to as element $u_1$ of the vector u, with corresponding perturbation element $l_1$ of l. Referring to FIG. 11, this can be achieved, for example, by scaling the corresponding shift distance τ of $l_1$ by a large value (step 172) as $$\hat{\tau}_l=L\tau_l, L\gg 1 \quad (22)$$

where $\tau_1$ is the shift parameter in the first position of a constellation shift parameter matrix which is represented as $$\Omega = \begin{bmatrix} \tau_1 & 0 & 0 & 0 \\ 0 & \tau_2 & \cdots & 0 \\ \vdots & \vdots & \ddots & \vdots \\ 0 & 0 & \cdots & \tau_K \end{bmatrix} \quad (23)$$

where $\tau_{1\ldots K}$ are constellation shift parameters for K spatial streams.

According to equation 22, $\tau_l$ can be scaled by a large scaling factor such that equation 23 is expressed as:

$$\tilde{\Omega} = \begin{bmatrix} L\tau_1 & 0 & 0 & 0 \\ 0 & \tau_2 & \cdots & 0 \\ \vdots & \vdots & \ddots & \vdots \\ 0 & 0 & \cdots & \tau_K \end{bmatrix} \quad (24)$$

As described in the forgoing paragraphs, it will be appreciated that there may be more than one pilot symbol in the matrix Ω and $\tilde{\Omega}$, or the pilot symbol may be positioned in any positions other than the first.

In accordance with the above, the constellation shift parameter matrix of equation 24 can be applied to the solution of equation (21), such that $$l_{all}=\arg\min\nolimits_{l'}\|P(u+\tilde{\Omega}l')\|^2 \quad (25)$$

In step 174, a scaling factor $\tilde{\Omega}\tilde{\Omega}^{-1}$ is applied to equation 25:

$$l_{all}=\arg\min\nolimits_{l'}\|P\tilde{\Omega}\tilde{\Omega}^{-1}(u+\tilde{\Omega}l')\|^2 \quad (26)$$

where $\tilde{\Omega}$ is as expressed in equation 24.

Accordingly, the minimisation problem of equation 26 (step 176) can be expressed as:

$$l_{all}=\arg\min\nolimits_{l'}\|\hat{P}(\tilde{\Omega}^{-1}u+l')\|^2 \quad (27)$$

such that the minimisation problem can be solved by:

$$l_{all}=\arg\min\nolimits_{l'}\|\hat{P}(\tilde{\Omega}^{-1}u+l')\|^2 \quad (28)$$

where $\hat{P}=P\tilde{\Omega}$ in this embodiment, and it will be appreciated that the closest point can be determined to the scaled lattice point $\tilde{\Omega}^{-1}u$.

Essentially, equation 28 supports different modulo shift values τ for different spatial streams sharing one frequency resource, thereby allowing the perturbation vector l in a subcarrier comprising at least on pilot symbol and at least one data symbol to be solved.

Once the minimisation problem is solved, vector perturbation can be applied to the data vector in step 178.

It will be appreciated by the person skilled in the art that there are a large number of solution methods that can be employed to solve the problem of equation 28. For instance, a sphere encoder can be used to find the solution of the minimisation problem.

It can also be demonstrated that the minimisation problem of equation 28 can also be approximated by lattice reduction aided closest point approximation as follows:

$$l_{approx}=-\hat{T}Q_{\tilde{\Omega}G}\kappa\{\hat{T}^{-1}u\} \quad (29)$$

where $$\hat{T}=LLL(\hat{P}) \quad (30)$$

In this example, $\hat{T}$ is the lattice reduction transformation matrix obtained by a lattice reduction by means of the LLL algorithm applied to $\hat{P}=P\tilde{\Omega}$. However, it will be appreciated that any other lattice reduction algorithm can also be employed.

The quantisation function as a simpler element-wise complex-valued rounding to the nearest Gaussian integer is $$l_{approx}=\hat{T}Q_{G}\kappa\{\hat{T}^{-1}\tilde{\Omega}^{-1}u\} \quad (31)$$

In a further example, the minimisation problem of equation 28 can also be solved by a method employing lattice reduction which has the capability of providing performance closer to an optimal solution previously described in UK patent application 0805306.8.

A method in accordance with a further embodiment of the invention will be discussed with reference to the flow chart of FIG. 12.

Figure 12:
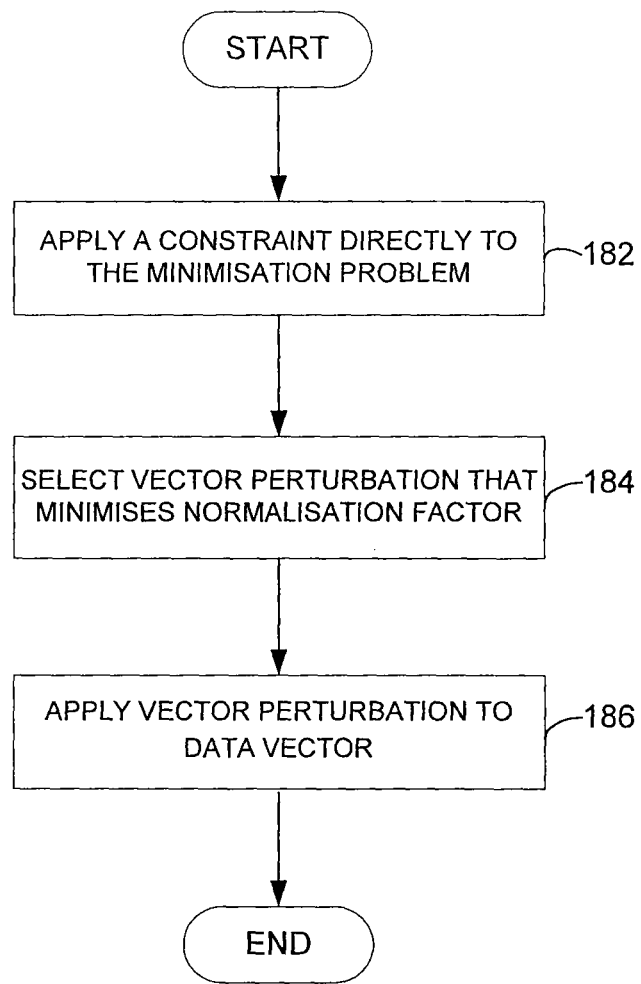
FIG. 12 illustrates a flow diagram of a precoding method in accordance with a second embodiment of the invention.

Referring to FIG. 12, in step 182, a zero-constraint is applied directly to the minimisation of the equation 11 such that the pilot symbols remain unperturbed. Accordingly, the solution of the perturbation vector can be expressed as $$l=\arg\min\nolimits_{l':l'_1=0}\|P(u+\tau l')\|^2 \quad (32)$$

where $l'_1$, in this example, is the perturbation element corresponding to the pilot symbol $u_1$. Accordingly equation 32 can be expressed as $$l = \operatorname{argmin}_{l'} \left\| P\left( u + \tau \begin{pmatrix} 0 \\ l' \end{pmatrix} \right) \right\|^2 \quad (33)$$

and $$l = \operatorname{argmin}_{l'} \left\| \begin{bmatrix} p_1 & \tilde{P} \end{bmatrix} \left( \begin{bmatrix} u_1 \\ \tilde{u} \end{bmatrix} + \tau \begin{bmatrix} 0 \\ l' \end{bmatrix} \right) \right\|^2 \quad (34)$$

where $p_1 \in \mathbb{C}^{M \times 1}$, $\tilde{P} \in \mathbb{C}^{M \times K-1}$, $u_1 \in \mathbb{C}$, $\tilde{u} \in \mathbb{C}^{K-1 \times 1}$, $\tilde{l} \in \mathbb{Z}^{K-1 \times 1}$.

It is noted that the perturbation vector l in this example is assembled from $$l = \begin{pmatrix} 0 \\ \tilde{l} \end{pmatrix},$$

and that $\tilde{l}$ is the argument minimising the norms in equation 33 and 34.

Equation (34) can be reformulated such that $$\tilde{l} = \arg\min_{l'} \| p_1 u_1 + \tilde{P}\tilde{u} + \tau \tilde{P}l' \|^2 = \arg\min_{l'} \| y + \tau \tilde{P}l' \|^2 \quad (35)$$

where $y = p_1 u_1 + \tilde{P}\tilde{u}$ and the data perturbation vector is $$l = \begin{pmatrix} 0 \\ \tilde{l} \end{pmatrix} \quad (36)$$

Alternatively, equation 35 can be formulated as $$\tilde{l} = \arg\min_{l'} \| \tilde{P}(\hat{\tilde{u}} + \tau l') \|^2 \quad (37)$$

where $\hat{\tilde{u}} = \tilde{P}^{-1}(p_1 u_1 + \tilde{P}\tilde{u})$.

One advantage of applying a constraint to the solution of the perturbation vector is that it reduces the dimensionality of the lattice search, and consequently reduces the computational complexity.

The pseudoinverse and the perturbation steps (steps 184, 186) of this embodiment are similar to that described above with reference to the flow chart of FIG. 11.

While the foregoing specific description of an embodiment of the invention has been provided for the benefit of the skilled reader, it will be understood that it should not be read as mandating any restriction on the scope of the invention. The invention should be considered as characterised by the claims appended hereto, as interpreted with reference to, but not bound by, the supporting description.

The invention claimed is:

1. A method of processing information prior to an emission from a multi-antenna device in a multi-user network having at least one user, said emission comprising transmission of a plurality of subcarriers comprising pilot symbols and data symbols, and said information being a data vector, the method comprising arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols, precoding said data vector prior to transmission, and the precoding comprising applying a perturbation to said data vector in order to generate a perturbed data vector in which data elements corresponding to the pilot symbol remain unperturbed, the pilot symbols thereby requiring less transmit power such that more power is available to transmit the data symbol, and scaling said data vector by means of a precoding matrix; wherein the applying of said perturbation to said precoded information is performed by selecting at least one of said perturbation elements corresponding to said at least one pilot symbol and scaling said selected element(s) on the basis of a scaling factor; wherein the scaling factor is a number substantially higher than 1, and is expressible in the form L>>1, where L is a scaling factor.

2. A method according to claim 1, wherein the perturbation is expressible as a perturbation vector comprising a diagonal matrix and a complex integer vector, said diagonal matrix containing perturbation elements corresponding to said at least one of data symbol and/or said at least one of pilot symbol.

3. A method according to any one of claims 1 and 2, wherein the perturbation vector is selected by solving an integer least squares problem such that a normalisation factor is minimised.

4. A method according to claim 3, wherein the solving of the integer least squares problem includes applying a further scaling factor to the integer least squares problem.

5. A method according to claim 4, wherein the integer least squares problem is expressible in the form $l_{all} = \arg\min_{l'} \| P(u + \Omega l') \|^2$, where $u + \Omega l'$ is a perturbed data vector, u is a data vector, Ω is a diagonal matrix of positive real numbers, l' is a complex integer vector, and P is a precoding matrix.

6. A method according to claim 4, wherein the further scaling factor is applied to the integer least squares problem such that said integer least squares problem is expressible in the form $l_{all} = \arg\min_{l'} \| \hat{P}(\Omega^{-1}u + l') \|^2$, where u is a data vector, Ω is a diagonal matrix of positive real numbers, l' is a complex integer vector, P is a precoding matrix and $\hat{P} = P\Omega$.

7. A method according to claim 6 further comprises the step of determining a solution for solving said integer least squares problem.

8. A method according to claim 7, wherein the solution is a lattice reduction closest point approximation expressible in the form $l_{approx} = -\hat{T} Q_G^K \{ \hat{T}^{-1} \Omega^{-1} u \}$, where $\hat{T}$ is a lattice reduction transformation matrix.

9. A method according to claim 8, wherein the lattice reduction transformation matrix is determined by applying a lattice reduction algorithm, and is expressible in the form $\hat{T} = LLL(\hat{P})$, where $\hat{P} = P\Omega$.

10. A method according to claim 2, wherein the perturbation elements are a plurality of constellation shift parameter.

11. A method according to claim 10, wherein the plurality of constellation shift parameter are distinct from each other.

12. A method of processing information prior to an emission from a multi-antenna device in a multi-user network having at least one user, said emission comprising transmission of a plurality of subcarriers comprising pilot symbols and data symbols, and said information being a data vector, the method comprising arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols, precoding said data vector prior to transmission, and the precoding comprising applying a perturbation to said data vector in order to generate a perturbed data vector in which data elements corresponding to the pilot symbol remain unperturbed, the pilot symbols thereby requiring less transmit power such that more power is available to transmit the data symbol, and scaling said data vector by means of a precoding matrix; wherein the perturbation is expressible as a perturbation vector, said perturbation vector comprises a number and a complex integer vector, said complex integer vector comprising at least one element corresponding to said at least one pilot symbol and/or at least one data symbol, said perturbation vector being selected by solving an integer least squares problem such that a normalisation factor is minimised, wherein said solving the integer least squares problem includes applying a constraint to the integer least squares problem.

13. A method according to claim 12, wherein the integer least squares problem is be expressible in the form $l=\arg\min_{l'} \|P(u+\tau l')\|^2$, where $u+\tau l'$ is a perturbed data vector, u is a data vector, $\tau$ is a positive real number, l' is a complex integer vector, and P is a precoding matrix.

14. A method according to claim 12 or claim 13, wherein the applying of constraint is performed by applying a zero constraint to said at least one element corresponding to said at least one pilot symbol, such that the integer least squares problem is expressible in the form $$l = \operatorname{argmin}_{l'} \left\| P\left(u + \tau \begin{pmatrix} 0 \\ l' \end{pmatrix}\right) \right\|^2.$$

where u is a data vector, $\tau$ is a positive real number, l' is a complex integer vector, and P is a precoding matrix.

15. A method according to claim 1, wherein the precoding matrix is a pseudo inverse channel characteristics of said at least one user.

16. A signal processing apparatus for processing information prior to an emission from a multi-antenna device in a multi-user network having at least one user, said emission comprising transmission of a plurality of subcarriers comprising pilot symbols and data symbols, and said information being a data vector, the signal processing apparatus comprising means for arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols, a precoding for precoding said data vector prior to transmission, and the precoder being further operable to apply a perturbation to said precoded data vector in order to generate a perturbed data vector in which data elements corresponding to the pilot symbol remain unperturbed, the pilot symbols thereby requiring less transmit power such that more power is available to transmission of the data symbol, and to scale said data vector by means of a precoding matrix; wherein the applying of said perturbation to said precoded information is performed by selecting at least one of said perturbation elements corresponding to said at least one pilot symbol and scaling said selected element(s) on the basis of a scaling factor; wherein the scaling factor is a number substantially higher than 1, and is expressible in the form L>>1, where L is a scaling factor.

17. A signal processing apparatus for processing information prior to an emission from a multi-antenna device in a multi-user network having at least one user, said emission comprising transmission of a plurality of subcarriers comprising pilot symbols and data symbols, and said information being a data vector, the signal processing apparatus comprising:
    means for arranging said pilot symbols and said data symbols such that at least one of said plurality of subcarriers comprises at least one of said pilot symbols and at least one of said data symbols, wherein said data vector corresponds to said at least one of said plurality of subcarriers such that said data vector comprises data elements corresponding to said at least one of said pilot symbols and said at least one of said data symbols; and
    a precoder configured to precode said data vector prior to transmission, to apply a perturbation to said precoded data vector in order to generate a perturbed data vector in which data elements corresponding to the pilot symbol remain unperturbed, the pilot symbols thereby requiring less transmit power such that more power is available to transmit the data symbol, and to scale said data vector by means of a precoding matrix;
    wherein the perturbation is expressible as a perturbation vector, said perturbation vector comprises a number and a complex integer vector, said complex integer vector comprising at least one element corresponding to said at least one pilot symbol and/or at least one data symbol, said perturbation vector being selected by solving an integer least squares problem such that a normalisation factor is minimised, wherein said solving the integer least squares problem includes applying a constraint to the integer least squares problem.

* * * * *